(12) United States Patent
Oh et al.

(10) Patent No.: US 11,260,461 B2
(45) Date of Patent: Mar. 1, 2022

(54) CUTTING INSERT AND CUTTING TOOL ON WHICH SAME IS MOUNTED

(71) Applicant: KORLOY INC., Seoul (KR)

(72) Inventors: Min Seok Oh, Cheongju-si (KR); Ki Chan Nam, Cheongju-si (KR); Byeong Yun Lee, Cheongju-si (KR); Hyo San Kim, Cheongju-si (KR); Young Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 0 days.

(21) Appl. No.: 16/962,041

(22) PCT Filed: Dec. 6, 2018

(86) PCT No.: PCT/KR2018/015356
§ 371 (c)(1),
(2) Date: Jul. 14, 2020

(87) PCT Pub. No.: WO2019/143018
PCT Pub. Date: Jul. 25, 2019

(65) Prior Publication Data
US 2020/0398353 A1     Dec. 24, 2020

(30) Foreign Application Priority Data

Jan. 19, 2018   (KR) .................. 10-2018-0007058

(51) Int. Cl.
*B23C 5/20* (2006.01)
*B23C 5/06* (2006.01)

(52) U.S. Cl.
CPC .............. *B23C 5/207* (2013.01); *B23C 5/06* (2013.01); *B23C 2200/0461* (2013.01);
(Continued)

(58) Field of Classification Search
CPC ...... B23C 2200/0461; B23C 2200/205; B23C 2200/208; B23C 2200/24; B23C 2200/28;
(Continued)

(56) References Cited

U.S. PATENT DOCUMENTS

| 5,158,402 | A | * | 10/1992 | Satran | ..................... B23C 5/202 407/113 |
| 5,597,271 | A | * | 1/1997 | Men | ...................... B23C 5/2213 407/113 |

(Continued)

FOREIGN PATENT DOCUMENTS

| JP | 07276130 | A | * | 10/1995 | ............. B23C 5/202 |
| JP | 08206912 | A | * | 8/1996 | ........... B23B 27/143 |

(Continued)

*Primary Examiner* — Nicole N Ramos
(74) *Attorney, Agent, or Firm* — Rabin & Berdo, P.C.

(57) ABSTRACT

A cutting insert of the present invention comprises: an upper surface and a lower surface; first and second lateral surfaces; first and second cutting edge parts; and corner cutting edges, wherein the first cutting edge part includes: a first main cutting edge for forming one end at a portion spaced farthest away from the corner cutting edge; a first sub-cutting edge connected to the corner cutting edge; and a first auxiliary cutting edge for connecting the first main cutting edge and the first sub-cutting edge so as to form a step between the same, and the first sub-cutting edge and the corner cutting edge form one straight line when viewed toward the first lateral surface, and are inclined upward in the direction opposite to the direction toward the lower surface while gradually going in the direction toward the second cutting edge part.

10 Claims, 8 Drawing Sheets

(52) U.S. Cl.
CPC .... *B23C 2200/205* (2013.01); *B23C 2200/24* (2013.01); *B23C 2200/28* (2013.01); *B23C 2210/045* (2013.01); *B23C 2210/0435* (2013.01)

(58) Field of Classification Search
CPC ...... B23C 2210/0435; B23C 2210/045; B23C 5/06; B23C 5/207; B23C 5/202; B23C 5/20; B23B 27/1611; B23B 2200/204; B23B 2200/208
See application file for complete search history.

(56) References Cited

U.S. PATENT DOCUMENTS

| | | | | |
|---|---|---|---|---|
| 5,848,862 | A * | 12/1998 | Antoun | B23B 27/007 408/199 |
| 5,951,214 | A * | 9/1999 | Rothballer | B23C 5/2213 407/42 |
| 5,971,672 | A * | 10/1999 | Hansson | B23C 5/202 407/113 |
| 6,050,752 | A * | 4/2000 | DeRoche | B23C 5/202 407/114 |
| 8,777,524 | B2 * | 7/2014 | Choi | B23C 5/109 407/42 |
| 9,370,832 | B2 * | 6/2016 | Kurokawa | B23B 27/1659 |
| 9,623,495 | B2 * | 4/2017 | Hoffer | B23C 5/06 |
| 9,718,138 | B2 * | 8/2017 | Ishi | B23C 5/06 |
| 2008/0304924 | A1 * | 12/2008 | Engstrom | B23C 5/202 407/114 |
| 2012/0070242 | A1 * | 3/2012 | Choi | B23C 5/109 407/113 |
| 2012/0155976 | A1 * | 6/2012 | Ishi | B23C 5/202 407/33 |
| 2012/0275868 | A1 * | 11/2012 | Saito | B23C 5/06 407/42 |
| 2016/0297011 | A1 * | 10/2016 | Park | B23B 27/145 |
| 2018/0111205 | A1 * | 4/2018 | Ishi | B23B 51/048 |

FOREIGN PATENT DOCUMENTS

| | | | | | |
|---|---|---|---|---|---|
| JP | | 2001009628 | A | * | 1/2001 |
| JP | | 2001009628 | A | | 1/2001 |
| JP | | 2009202324 | A | * | 9/2009 |
| JP | | 2009226577 | A | * | 10/2009 |
| KR | | 101519747 | | | 5/2015 |
| KR | | 101532780 | | | 6/2015 |
| WO | WO-9635538 | A1 | * | 11/1996 | ........... B23C 5/2213 |

* cited by examiner

→ : DIRECTION OF ROTATION OF TOOL HOLDER

CUTTING INSERT AND CUTTING TOOL ON WHICH SAME IS MOUNTED

TECHNICAL FIELD

The present invention relates to a cutting insert and a cutting tool on which the same is mounted.

BACKGROUND ART

Generally, a cutting insert is fastened to a cutting tool mounted on a machine tool and is used for cutting a workpiece, such as a machine part and so on that is made of iron, non-ferrous metal, non-metal material, and so on.

Such a cutting insert includes an upper surface, a lower surface facing an opposite direction thereto, a lateral surface connecting the upper surface and the lower surface, and a cutting edge forming a boundary between the upper surface and the lateral surface and substantially cutting a workpiece.

As the related art, the indexable end-milling insert disclosed in Korean Patent Publication No. 10-1532780 includes an under side (hereinafter, referred to as "lower surface") 14, an upper side (hereinafter, referred to as "upper surface"), four clearance sides (hereinafter referred to as "lateral surfaces") 15, a main edge (hereinafter referred to as "main cutting edge") 18, a wiper edge (hereinafter referred to as "sub-cutting edge") 19, and a corner 17, as shown in FIG. 7. A main cutting edge 18 extends arched between a first end 38 and a second end 39 on the opposite side, the second end 38 is positioned higher than the first end 38 with respect to the lower surface 14, the sub-cutting edge 19 is positioned along the lateral surface 15 on the same side as the main cutting edge 18 and is positioned lower than the main cutting edge 18, and there is a corner cutting edge section rising sharply at the corner 17 due to a difference in height between the sub-cutting edge 19 and the main cutting edge 18, and a main clearance surface 22 has a width that decreases from two opposite ends 38, 39 toward a section 40 with a minimum width between the two opposite ends.

However, since such a conventional technique provides a technical configuration that has the corner cutting edge section rising sharply at the corner due to the difference in height between the sub-cutting edge and the main cutting edge, there is a problem that a load occurs during processing caused by interference with a workpiece due to such a sharply raised corner cutting edge section. Due to an occurrence of such a processing load, there is a problem that the service life of the cutting insert is decreased and the surface roughness of the workpiece is decreased.

SUMMARY

Technical Problem

The technical problem of the present invention is to provide a cutting insert allowing to minimize a processing load even when a main cutting edge and a sub-cutting edge have a difference in height and are stepped on one lateral surface, and a cutting tool mounted with the same.

Technical Solution

In order to achieve the object described above, a cutting insert according to an embodiment of the present invention is provided, which may include an upper surface and a lower surface facing opposite directions to each other, and first and second lateral surfaces connecting between the upper surface and the lower surface and being adjacent to each other, and may include: a first cutting edge part forming a boundary between the upper surface and the first lateral surface; a second cutting edge part forming a boundary between the upper surface and the second lateral surface; and a corner cutting edge connecting the first cutting edge part and the second cutting edge part, in which the first cutting edge part may include: a first main cutting edge forming one end at a portion spaced farthest away from the corner cutting edge; a first sub-cutting edge connected to the corner cutting edge; and a first auxiliary cutting edge connecting the first main cutting edge and the first sub-cutting edge so as to form a step therebetween, in which the first sub-cutting edge and the corner cutting edge may form one straight line when viewed toward the first lateral surface, and be inclined upward in the direction opposite to the direction toward the lower surface while gradually going in the direction toward the second cutting edge part.

The first cutting edge part may have a maximum height with respect to the lower surface at a first connection point where the first main cutting edge and the first auxiliary cutting edge meet, and may have a minimum height with respect to the lower surface at a second connection point where the first auxiliary cutting edge and the first sub-cutting edge meet.

The second cutting edge part may include a second main cutting edge forming one end at a portion contacting the corner cutting edge, and when the upper surface is an X-Y plane and a Z-axis passes through a center of the upper surface, viewing the first lateral surface after rotating the same by 45 degrees with respect to the Z axis reveals that the first sub-cutting edge, the corner cutting edge, and the second main cutting edge may form one straight line section and be inclined upward in a direction opposite to a direction toward the lower surface while gradually going in the direction toward the other end of the second main cutting edge.

The straight line section may form a rake angle of 0.5 to 3 degrees with respect to the lower surface.

When viewed toward the upper surface, the first and second cutting edge parts may be rotationally symmetrical by 90 degrees with respect to the center of the upper surface.

The first lateral surface may include: an upper clearance surface contacting the first cutting edge part; a lower clearance surface contacting the lower surface; and an intermediate clearance surface connecting the upper clearance surface and the lower clearance surface.

A main cutting edge-neighboring clearance surface portion of the upper clearance surface, which contacts the first main cutting edge, may have the same width for the entire area in the circumferential direction when viewed toward the first lateral surface.

The main cutting edge-neighboring clearance surface portion may form a larger angle with respect to the lower surface with a decreasing distance to the first auxiliary cutting edge.

The lower clearance surface may have the same width in the entire area along the circumferential direction thereof, when viewed toward the first lateral surface, and form the same angle with respect to the lower surface in the entire area along the circumferential direction thereof.

The intermediate clearance surface may form a larger angle with respect to the lower surface with a decreasing distance to the second lateral surface.

Meanwhile, a cutting tool according to an embodiment of the present invention may be a cutting tool on which the cutting insert according to the embodiments of the present invention described above is mounted, and which may include a seat surface on which the lower surface is placed, in which the seat surface may be formed such that the cutting insert is mounted at a negative radial rake angle and a positive axial rake angle.

Advantageous Effects

As described above, a cutting insert and a cutting tool on which the same is mounted according to embodiments of the present invention may have the following effects.

According to an embodiment of the present invention, a technical configuration is provided in which, when viewed toward the first lateral surface, the first sub-cutting edge and the corner cutting edge form one straight line and are inclined upward in a direction opposite to a direction toward the lower surface while gradually going in the direction toward the second cutting edge part. Accordingly, unlike the conventional technique, a vulnerable section in which the corner cutting edge rises sharply with respect to the first sub-cutting edge may not occur, and the first sub-cutting edge and the corner cutting edge may be smoothly connected, thereby minimizing the processing load applied to the corner cutting edge even when the first main cutting edge and the first sub-cutting edge have a difference in height and are stepped. As a result, the service life of the cutting insert and the surface roughness of a workpiece can be significantly enhanced due to such a minimized processing load.

BEST MODE FOR INVENTION

Hereinafter, preferred embodiments of the present invention will be described in detail with reference to the accompanying drawings, which will be readily apparent to those skilled in the art to which the present invention pertains. However, the description proposed herein is just a preferable example for the purpose of illustrations only, and not intended to limit the scope of the invention, so it should be understood that other equivalents and modifications could be made thereto without departing from the scope of the invention.

Figure 1:
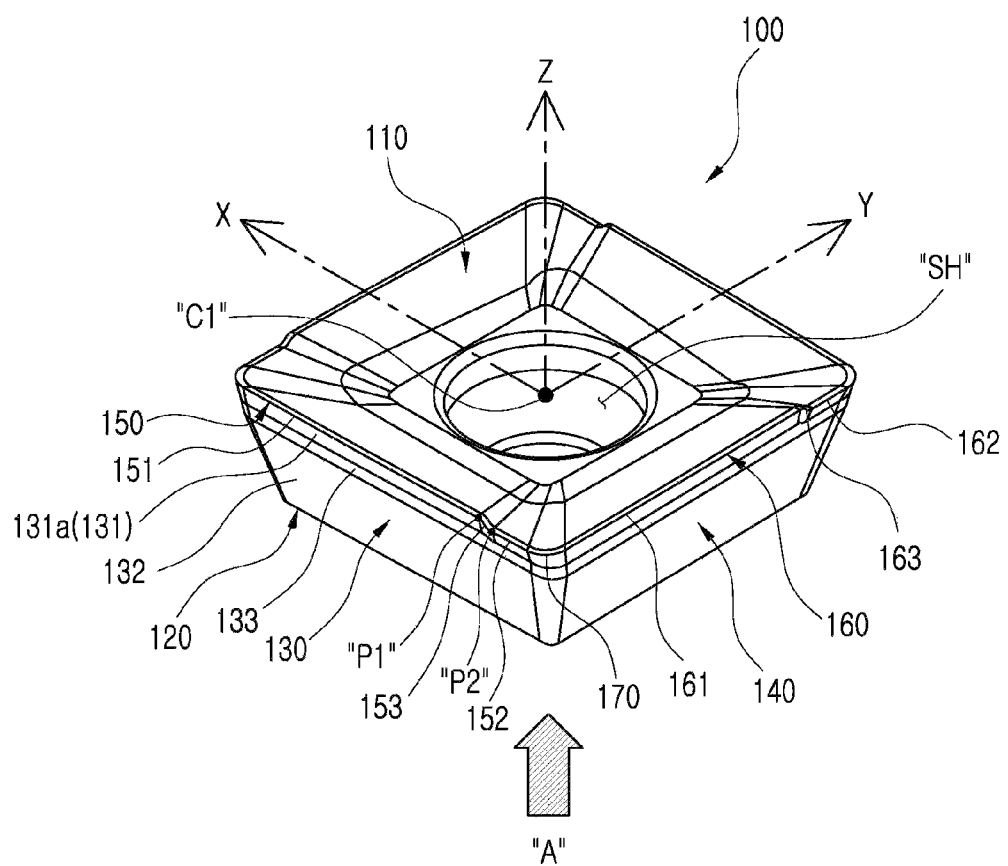
FIG. 1 is a perspective view schematically showing a cutting insert according to an embodiment of the present invention.
Figure 2:
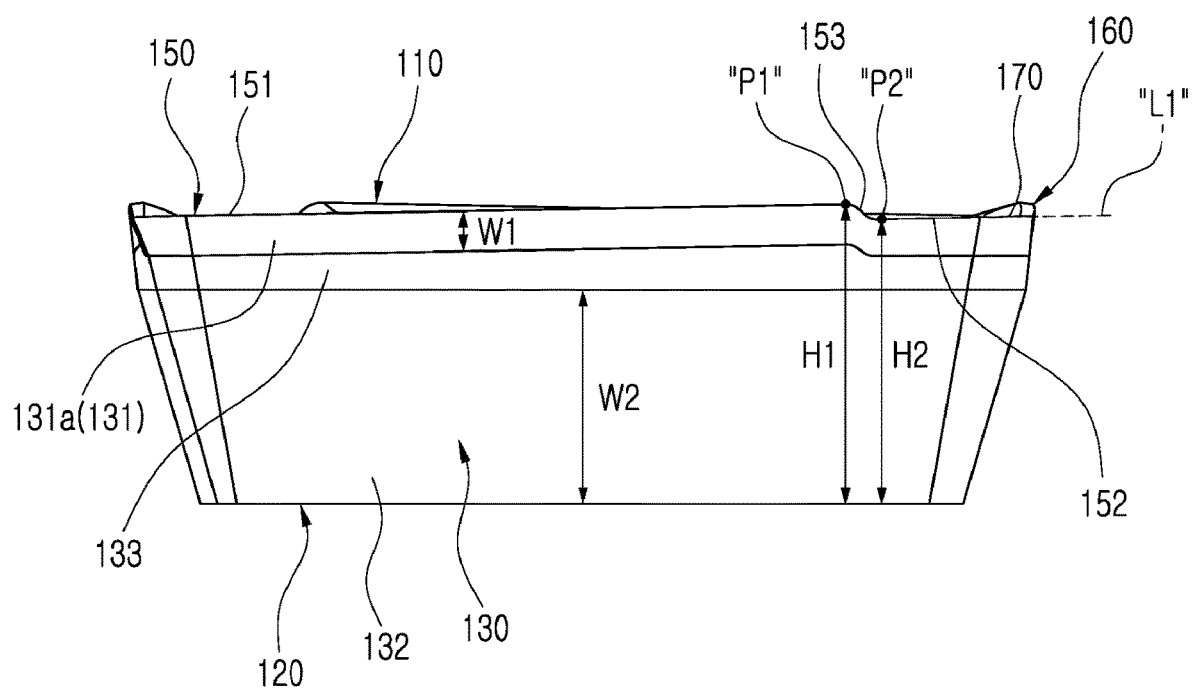
FIG. 2 is a view showing the cutting insert of FIG. 1 when viewed toward a first lateral surface.
Figure 3:
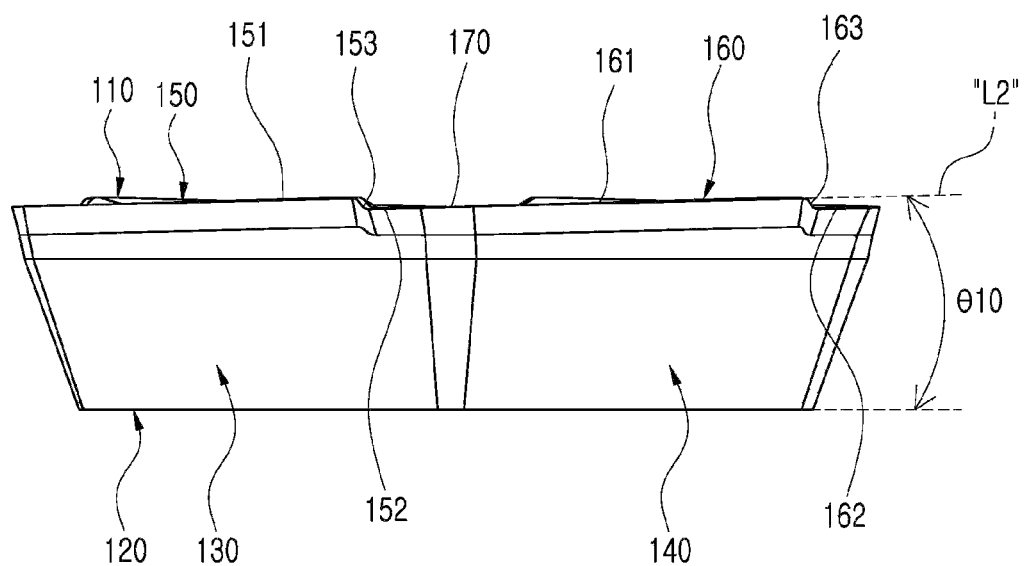
FIG. 3 is a view showing the cutting insert of FIG. 1 when viewed in the direction of an arrow "A".

FIG. 1 is a perspective view schematically showing a cutting insert according to an embodiment of the present invention, FIG. 2 is a view showing the cutting insert of FIG. 1 when viewed toward a first lateral surface, and FIG. 3 is a view showing the cutting insert of FIG. 1 when viewed in the direction of an arrow "A".

Figure 4:
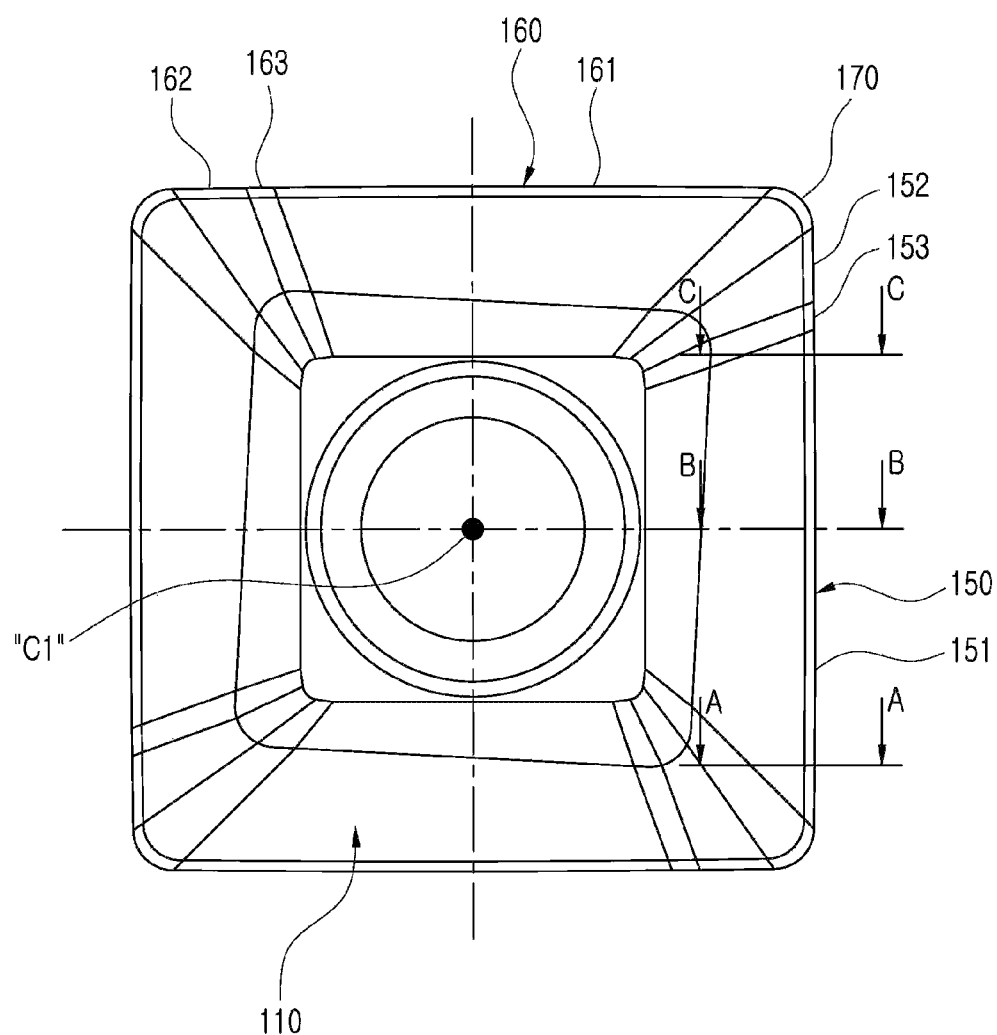
FIG. 4 is a view showing the cutting insert of FIG. 1 when viewed toward an upper surface.
Figure 5A:
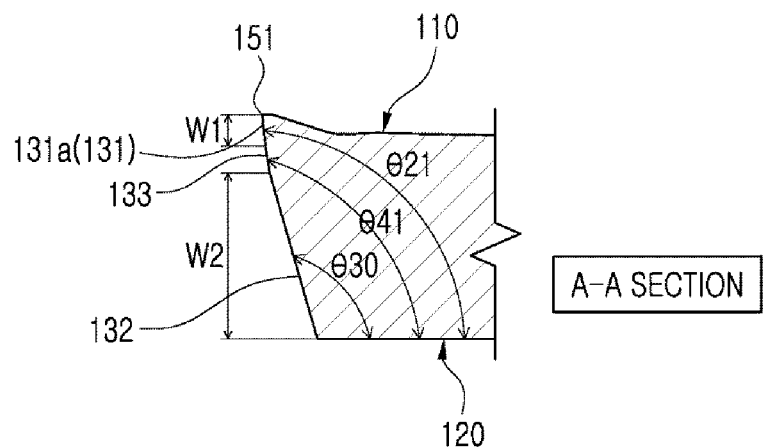
FIG. 5A is a cross-sectional view showing the cutting insert of FIG. 4 taken along line A-A.
Figure 5B:
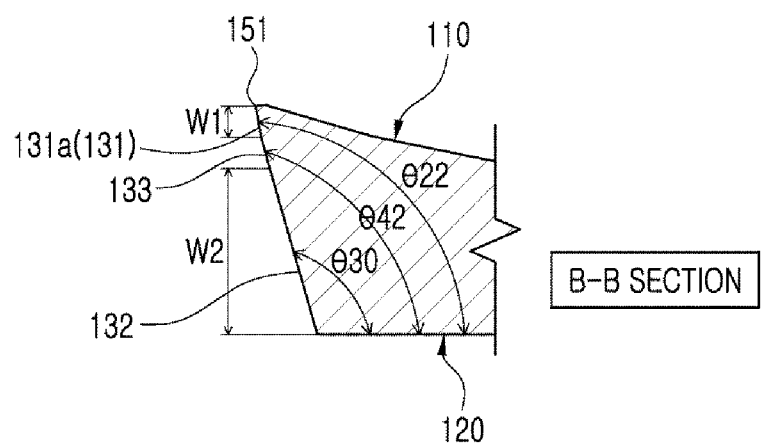
FIG. 5B is a cross-sectional view taken along line B-B.
Figure 5C:
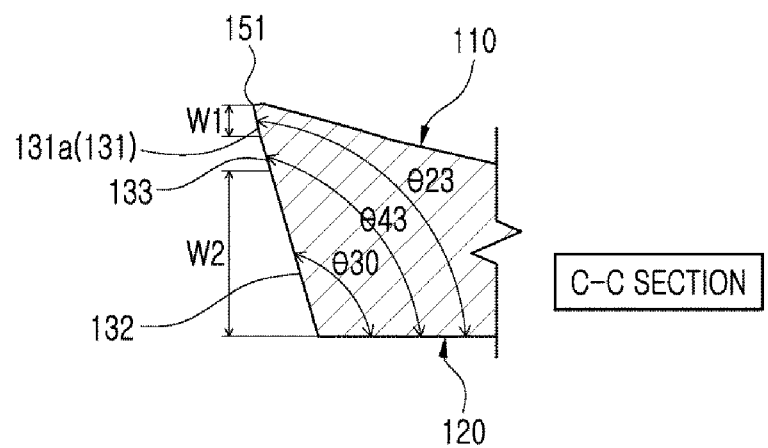
FIG. 5C is a cross-sectional view taken along line C-C.
Figure 6A:
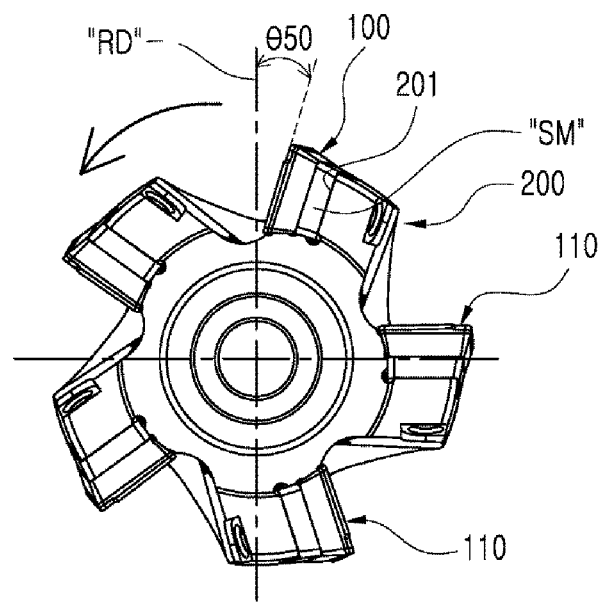
FIGS. 6A and 6B are a bottom view and a side view schematically showing a cutting tool on which the cutting insert of FIG. 1 is mounted.
Figure 6B:
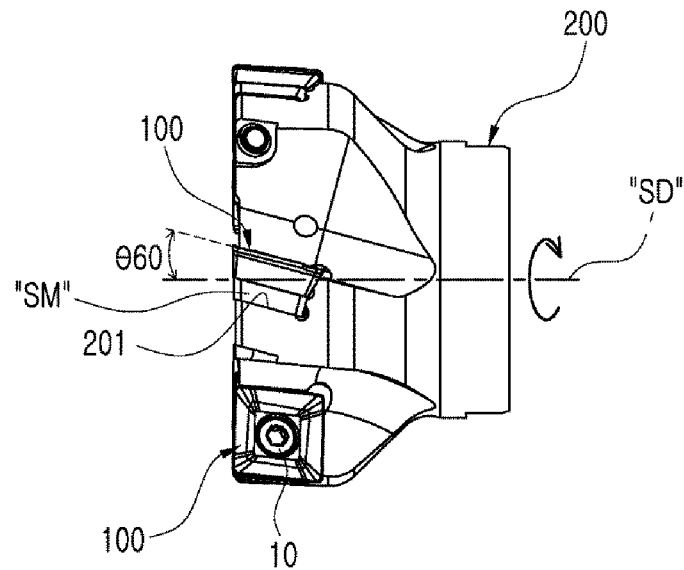
Figure 7:
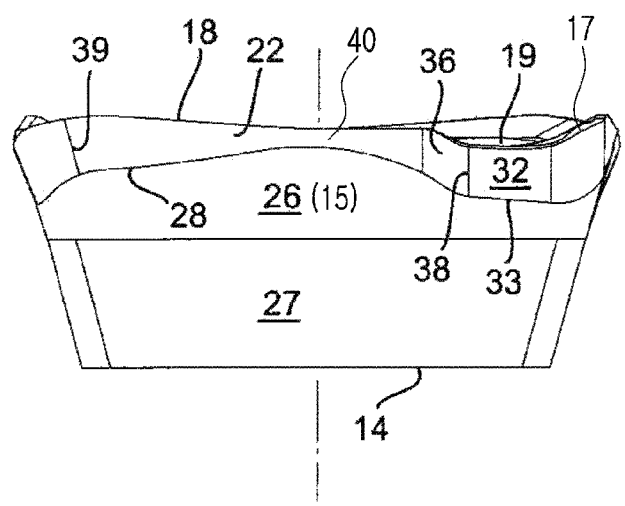
FIG. 7 is a view schematically showing a conventional indexable end milling insert.

FIG. 4 is a view of the cutting insert of FIG. 1 when viewed toward an upper surface, FIG. 5A is a cross-sectional view showing the cutting insert of FIG. 4 taken along line A-A, FIG. 5B is a cross-sectional view taken along line B-B, and FIG. 5C is a cross-sectional view taken along line C-C. FIGS. 6A and 6B are a bottom view and a side view schematically showing a cutting tool on which the cutting insert of FIG. 1 is mounted.

A cutting insert 100 according to an embodiment of the present invention includes an upper surface 110, a lower surface 120, first and second lateral surfaces 130, 140, a screw hole (SH), a first cutting edge part 150, a second cutting edge part 160, and a corner cutting edge 170, as shown in FIGS. 1 to 6. Hereinafter, each of the components will be described in detail with continued reference to FIGS. 1 to 6.

As shown in FIGS. 1 to 4, the upper surface 110 and the lower surface 120 may face opposite directions to each other, and the first and second lateral surfaces 130 and 140 may connect between the upper surface 110 and the lower surface 120 and be adjacent to each other. In addition, as shown in FIGS. 1 and 4, the screw hole (SH) may be formed to penetrate the upper surface 110 and the lower surface 120, to be inserted with a bolt for fastening (see 10 in FIG. 6B) with a cutting tool (200 in FIG. 6). Furthermore, the upper surface 110 may have a substantially square shape to allow right-angle processing with respect to a workpiece as shown in FIGS. 1 and 4.

In addition, the first cutting edge part 150, the second cutting edge part 160, and the corner cutting edge 170 are components that substantially cut the workpiece. Specifically, as shown in FIGS. 1 to 4, the first cutting edge part 150 may be provided at a boundary portion between the upper surface 110 and the first lateral surface 130, the second cutting edge part 160 may be provided at a boundary portion between the upper surface 110 and the second lateral surface 140, and the corner cutting edge part 170 may be provided at a corner portion between the first cutting edge part 150 and the second cutting edge part 160.

Hereinafter, the first and second cutting edge parts 150 and 160 will be described in detail with continued reference to FIGS. 1 to 4.

As shown in FIGS. 1 to 4, the first cutting edge part 150 may include a first main cutting edge 151, a first sub-cutting edge 152, and a first auxiliary cutting edge 153. The first main cutting edge 151 may connect between a portion spaced farthest away from the corner cutting edge 170 and the first auxiliary cutting edge 153, the first sub-cutting edge 152 may connect between the first auxiliary cutting edge 153 and the corner cutting edge 170, and the first auxiliary cutting edge 153 may connect the first main cutting edge 151 and the first sub-cutting edge 152 so as to form a step between the same.

In addition, as shown in FIG. 2, the first cutting edge part 150 may have a maximum height H1 with respect to the lower surface 120 at a first connection point P1 where the first main cutting edge 151 and the first auxiliary cutting edge 153 meet, and have a minimum height H2 with respect to the lower surface 120 at a second connection point P2 where the first auxiliary cutting edge 153 and the first sub-cutting edge 152 meet.

In addition, as shown in FIG. 2, when viewed toward the first lateral surface 130, the first sub-cutting edge 152 and the corner cutting edge 170 may form a straight line L1 and be inclined upward in a direction opposite to a direction toward the lower surface 120 while gradually going in the direction toward the second cutting edge part 160. Accordingly, unlike the conventional technique, a vulnerable section in which the corner cutting edge 170 rises sharply with respect to the first sub-cutting edge 152 may not occur, and the first sub-cutting edge 152 and the corner cutting edge 170 may be smoothly connected as one straight line L1, such that the processing load applied to the corner cutting edge 170 can be minimized even when the first main cutting edge 151 and the first sub-cutting edge 152 are stepped. As a result, the cutting insert 100 according to the present invention may have significantly enhanced service life and surface roughness (or surface roughness) of the workpiece due to such a minimized processing load.

The second cutting edge part 160 may include a second main cutting edge 161, a second sub-cutting edge 162, and a second auxiliary cutting edge 163 as shown in FIGS. 1, 3, and 4. The second main cutting edge 161 may connect between a portion contacting the corner cutting edge 170 and the second auxiliary cutting edge 163, the second sub-cutting edge 162 may connect between the second sub-cutting edge 163 and a portion spaced farthest away from the corner cutting edge 170, and the second auxiliary section 163 may connect the second main cutting edge 161 and the second sub-cutting edge 162 so as to form a step between the same.

Further, as shown in FIG. 4, when viewed toward the upper surface 110, the first and second cutting edge parts 150 and 160 may be rotationally symmetrical by 90 degrees with respect to the center C1 of the upper surface 110.

In addition, as shown in FIG. 1, when the upper surface 110 is an X-Y plane and the Z axis is passed through the center C1 of the upper surface 110, viewing the first lateral surface 130 shown in FIG. 2 after rotating it by 45 degrees with respect to the Z axis of FIG. 1, that is, viewing the first and second lateral surfaces 130 and 140 with the corner cutting edge 170 being positioned at the center reveals that the first sub-cutting edge 152, the corner cutting edge 170, and the second main cutting edge 161 may form a straight line section L2 and then be inclined upward in a direction opposite to a direction toward the lower surface 120 while gradually going in the direction toward the other end of the second main cutting edge 161 as shown in FIG. 3. Accordingly, unlike the conventional technique, a vulnerable section in which the corner cutting edge 170 rises sharply with respect to the first sub-cutting edge 152 may not occur, and the first sub-cutting edge 152, the corner cutting edge 170, and the second main cutting edge 161 may be smoothly connected by one straight line section L2, such that the processing load applied to the corner cutting edge 170 or the second main cutting edge 161 can be minimized. As a result, the service life of the cutting insert 100 according to the present invention and the surface roughness (or surface roughness) of the workpiece may be significantly enhanced due to such a minimized processing load. In addition, when the cutting insert 100 according to the present invention is mounted on the cutting tool (200 in FIG. 6) according to the present invention and processed, such a straight line section L2 can constantly maintain the same helix angle regardless of an amount of cutting (cut depth of a workpiece), thereby preventing a rapid increase in the processing load.

For example, as shown in FIG. 3, such a straight line section L2 may form a rake angle ($\theta 10$) of 0.5 to 3 degrees with respect to the lower surface 120.

Hereinafter, the first lateral surface 130 will be described in detail with continued reference to FIGS. 1, 2, 4, and 5.

As shown in FIGS. 1 and 2, the first lateral surface 130 may include an upper clearance surface 131 contacting the first cutting edge part 150, a lower clearance surface 132 contacting the lower surface 120, and an intermediate clearance surface 133 connecting between the upper clearance surface 131 and the lower clearance surface 132.

Furthermore, as shown in FIG. 2, when viewed toward the first lateral surface 130, a main cutting edge-neighboring clearance surface portion 131a of the upper clearance surface 131, which contacts the first main cutting edge 151, may have the same width W1 in the entire area along the circumferential direction thereof. Therefore, the first main cutting edge 151 may ensure the same rigidity for each cutting (cut depth of the workpiece).

In addition, as shown in FIGS. 4 and 5, the main cutting edge-neighboring clearance surface portion 131a may form a larger angle ($\theta 21$, $\theta 22$, and $\theta 23$) with respect to the lower surface 120 with a decreasing distance to the first auxiliary cutting edge 153. For example, in the main cutting edge-neighboring clearance surface portion 131a, a portion that is adjacent to the corner cutting edge 170 where the processing load is the largest, may form a roughly right angle with respect to the lower surface 120 (that is, may approximately be a negative clearance surface) to thus ensure the corresponding rigidity according to the processing load, and in the main cutting edge-neighboring clearance surface portion 131a, a portion that is adjacent to the first auxiliary cutting edge 153 where the processing load is relatively small, may form an obtuse angle with respect to the lower surface 120 (that is, may be a positive clearance surface) to thus reduce interference with the workpiece. For example, this angle ($\theta 21$, $\theta 22$, and $\theta 23$) may be in the range of 90 to 120 degrees.

In addition, as shown in FIG. 2, when viewed toward the first lateral surface 130, the lower clearance surface 132 may have the same width W2 in the entire area along the circumferential direction, and as shown in FIGS. 4 and 5, the lower clearance surface 132 may form the same angle ($\theta 30$) with respect to the lower surface 120 in the entire area along the circumferential direction. Specifically, since the lower clearance surface 132 is a portion that is fastened to a seating portion (or pocket) of the cutting tool (200 in FIG. 6), when the same width (W2) and the same angle ($\theta 30$) are provided as described above, the error (design error or manufacturing error) of the seating portion of the cutting tool 200 as well as the lower clearance surface 132 may be reduced, and the reduced error may result in the lower clearance surface 132 being in close contact with the seating portion of the cutting tool (200 in FIG. 6), thereby increasing the fastening force.

Further, as shown in FIGS. 4 and 5, the angle ($\theta 41$, $\theta 42$, and $\theta 43$) formed between the intermediate clearance surface 133 and the lower surface 120 may become gradually larger with a decreasing distance to the second lateral surface 140. For example, this angle ($\theta 41$, $\theta 42$, and $\theta 43$) may be in the range of 90 to 120 degrees.

Hereinafter, a cutting tool 200 according to an embodiment of the present invention will be described in detail with reference to FIG. 6.

As shown in FIG. 6, the cutting tool 200 according to an embodiment of the present invention is a cutting tool on which the cutting insert 100 according to an embodiment of the present invention described above is mounted, and may include a seat surface 201 on which the lower surface 120 of the cutting insert 100 described above is placed. Furthermore, as shown in FIG. 6, an auxiliary member SM may be further included between the lower surface 120 and the seat surface 201.

As shown in FIG. 6, the seat surface 201 may be formed such that the cutting insert 100 described above is mounted at a negative radial rake angle (θ50) and a positive axial rake angle (θ60).

For reference, the negative radial rake angle (θ50) may refer to by how much degree the cutting insert 100 mounted on the cutting tool 200 is inclined in a negative (−) direction that is opposite to the rotational direction of the cutting tool 200 with respect to the radial straight line (RD), and the positive axial rake angle (θ60) may refer to by how much degree the cutting insert 100 mounted on the cutting tool 200 is inclined in a positive (+) direction that is the rotational direction of the cutting tool 200 with respect to the axis of rotation (SD).

The present invention has been described in detail. However, it should be understood that the detailed description and specific examples, while indicating preferred embodiments of the invention, are given by way of illustration only, since various changes and modifications within the scope of the invention will become apparent to those skilled in the art from this detailed description.

INDUSTRIAL APPLICABILITY

The present invention can be used for cutting inserts and cutting tools.

What is claimed is:

1. A cutting insert comprising an upper surface and a lower surface facing opposite directions to each other, and first and second lateral surfaces connecting the upper surface and the lower surface and being adjacent to each other, wherein the cutting insert comprises:
   a first cutting edge part forming a boundary between the upper surface and the first lateral surface;
   a second cutting edge part forming a boundary between the upper surface and the second lateral surface; and
   a corner cutting edge connecting the first cutting edge part and the second cutting edge part,
   wherein the first cutting edge part comprises:
      a first main cutting edge forming one end at a portion spaced farthest away from the corner cutting edge;
      a first sub-cutting edge connected to the corner cutting edge; and
      a first auxiliary cutting edge connecting the first main cutting edge and the first sub-cutting edge so as to form a step therebetween,
   wherein the first sub-cutting edge and the corner cutting edge, when viewing the first lateral surface, form one straight line and are inclined upward in a direction opposite to a direction toward the lower surface while gradually going in the direction toward the second cutting edge part,
   wherein the second cutting edge part comprises a second main cutting edge forming one end at a portion contacting the corner cutting edge, and when the upper surface is an X-Y plane and a Z-axis passes through a center of the upper surface, viewing the first lateral surface after rotating the first lateral surface by 45 degrees with respect to the Z axis reveals that the first sub-cutting edge, the corner cutting edge, and the second main cutting edge form one straight line section and are inclined upward in a direction opposite to a direction toward the lower surface while gradually going in the direction toward the other end of the second main cutting edge, and
   wherein the first lateral surface comprises:
      an upper clearance surface contacting the first cutting edge part;
      a lower clearance surface contacting the lower surface; and
      an intermediate clearance surface connecting the upper clearance surface and the lower clearance surface.

2. The cutting insert according to claim 1, wherein the first cutting edge part has a maximum height with respect to the lower surface at a first connection point where the first main cutting edge and the first auxiliary cutting edge meet, and
   has a minimum height with respect to the lower surface at a second connection point where the first auxiliary cutting edge and the first sub-cutting edge meet.

3. The cutting insert according to claim 1, wherein the straight line section forms a rake angle of 0.5 to 3 degrees with respect to the lower surface.

4. The cutting insert according to claim 1, wherein, when viewing the upper surface, the first and second cutting edge parts are rotationally symmetrical by 90 degrees with respect to a center of the upper surface.

5. The cutting insert according to claim 1, wherein a main cutting edge-neighboring clearance surface portion of the upper clearance surface, which contacts the first main cutting edge, has a constant width along a circumferential direction, when viewing the first lateral surface.

6. The cutting insert according to claim 1, wherein a main cutting edge-neighboring clearance surface portion of the upper clearance surface, which contacts the main cutting edge, is shaped such that an angle between the main cutting edge-neighboring clearance surface portion and the lower surface increases with a decreasing distance to the first auxiliary cutting edge.

7. The cutting insert according to claim 1, wherein the lower clearance surface has a constant width along a circumferential direction thereof, when viewing the first lateral surface, and
   an angle formed by the lower clearance surface and the lower surface is constant along the circumferential direction thereof.

8. The cutting insert according to claim 1, wherein the intermediate clearance surface forms an angle with respect to the lower surface which increases with a decreasing distance to the second lateral surface.

9. A cutting tool on which the cutting insert according to claim 1 is mounted, the cutting tool comprising a seat surface on which the lower surface is placed,
   wherein the seat surface is formed such that the cutting insert is mounted at a negative radial rake angle and a positive axial rake angle.

10. A cutting insert comprising an upper surface and a lower surface facing opposite directions to each other, and first and second lateral surfaces connecting the upper surface and the lower surface and being adjacent to each other, wherein the cutting insert comprises:
   a first cutting edge part forming a boundary between the upper surface and the first lateral surface;
   a second cutting edge part forming a boundary between the upper surface and the second lateral surface; and
   a corner cutting edge connecting the first cutting edge part and the second cutting edge part,
   wherein the first cutting edge part comprises:
      a first main cutting edge forming one end at a portion spaced farthest away from the corner cutting edge;
      a first sub-cutting edge connected to the corner cutting edge; and a first auxiliary cutting edge connecting the first main cutting edge and the first sub-cutting edge so as to form a step therebetween, wherein the first sub-cutting edge and the corner cutting edge, when viewing the first lateral surface, form one straight line and are inclined upward in a direction opposite to a direction toward the lower surface while gradually going in the direction toward the second cutting edge part, wherein the second cutting edge part comprises a second main cutting edge forming one end at a portion contacting the corner cutting edge, and when the upper surface is an X-Y plane and a Z-axis passes through a center of the upper surface, viewing the first lateral surface after rotating the first lateral surface by 45 degrees with respect to the Z axis reveals that the first sub-cutting edge, the corner cutting edge, and the second main cutting edge form one straight line section and are inclined upward in a direction opposite to a direction toward the lower surface while gradually going in the direction toward the other end of the second main cutting edge.

\* \* \* \* \*